(12) United States Patent
Gibbs et al.

(10) Patent No.: US 6,396,247 B1
(45) Date of Patent: May 28, 2002

(54) EXCITER SYSTEM WITH PROTECTION FOR MANUAL REGULATOR FAILURE AND AN ELECTRIC GENERATOR INCORPORATING SAME

(75) Inventors: Irving A. Gibbs, Fletcher; Rolando F. Martinez, Arden, both of NC (US)

(73) Assignee: Eaton Corporation, Cleveland, OH (US)

( * ) Notice: Subject to any disclaimer, the term of this patent is extended or adjusted under 35 U.S.C. 154(b) by 28 days.

(21) Appl. No.: 09/713,785

(22) Filed: Nov. 15, 2000

(51) Int. Cl.[7] .............................................. H02P 9/14
(52) U.S. Cl. ...................................................... 322/28
(58) Field of Search .................. 322/28, 20; H02P 9/14

(56) References Cited

U.S. PATENT DOCUMENTS 5,031,086 A * 7/1991 Dhyanchand et al. ......... 322/28
5,225,973 A * 7/1993 Patel et al. .................... 322/28
5,418,446 A * 5/1995 Hallidy ......................... 322/28

OTHER PUBLICATIONS

C. Allen Morse et al., "New Multi–Processor Digital Excitation System", *Procedures of IEEE*, Jul., 2000.

* cited by examiner

Primary Examiner—Nestor Ramirez
Assistant Examiner—Karen Addison
(74) Attorney, Agent, or Firm—Martin J. Moran

(57) ABSTRACT

A regulator selector for selecting between an automatic regulator and a manual regulator for controlling field excitation provided to an exciter in a synchronous electric power generator, includes logic which prevents switching from the automatic regulator to a failed manual regulator.

6 Claims, 4 Drawing Sheets

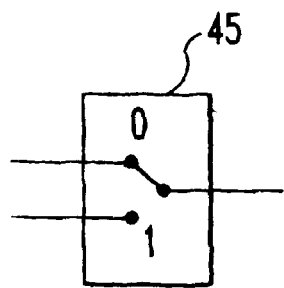
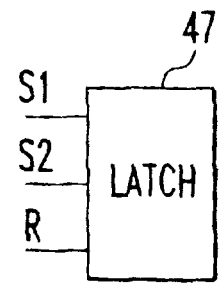
*FIG.3a*  *FIG.3b*
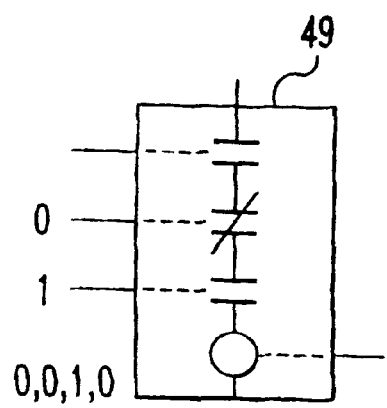
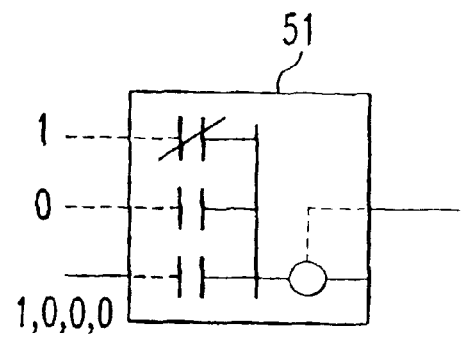
*FIG.3c*  *FIG.3d*

EXCITER SYSTEM WITH PROTECTION FOR MANUAL REGULATOR FAILURE AND AN ELECTRIC GENERATOR INCORPORATING SAME

BACKGROUND OF THE INVENTION

1. Field of the Invention

This invention relates to generators for generating electric power and more particularly to an exciter for such a generator having an automatic regulator and a manual regulator with a regulator selector which prevents switching from the automatic regulator to the manual regulator when the latter has failed.

2. Background Information

A synchronous electric power generator has a rotor with a field winding energized by an exciter through slip rings. Current in the rotor creates a rotating magnetic field which induces current in the stator to produce an output voltage at terminals of the stator. Originally, such machines had an exciter formed by a source and a rheostat which the operator manually adjusted to control the field current. Thus, such an arrangement was known as a manual control. Present systems have an arrangement which includes a transducer providing feedback of field current or field voltage which is used to automatically regulate the field current or voltage. As this system regulates the field current or voltage, as did the old manual control, it is still referred to as the "manual regulator", even though it is automatic.

The modem systems also have a second regulator which regulates terminal voltage (on the stator) through feedback provided by a potential transformer (PT). This system is referred to as the "automatic regulator" and is the preferred control as it directly regulates terminal voltage, the primary controlled variable.

PT's are known to fail. Also, they are protected by a fuse which can blow, thereby causing the automatic voltage regulator to fail. Present systems automatically switch to the "manual system" under these conditions. Also, under certain conditions the operator may want to switch from the automatic regulator to the manual system, such as for servicing or replacing the automatic regulator. However, it is also known that the transducer in the feedback loop of the manual system can fail. Typically, the operator has no indication of the transducer failure. Thus, a transfer could be made into the failed manual regulator resulting in total loss of exciter current. The resulting loss of generator output is unacceptable.

There is a need, therefore, for an improved synchronous generator, with a control system which prevents transfer to a failed manual voltage regulator.

SUMMARY OF THE INVENTION

This need and others is satisfied by the invention which is directed to an exciter system and an electric power generator incorporating such an exciter system having an automatic regulator and a manual regulator and a regulator selector which prevents switching from the automatic regulator to the manual regulator when the manual regulator has failed. More particularly, the invention is directed to an electric power generator comprising a rotor having a field winding, a prime mover rotating the rotor, a stator having a stator winding with output terminals, and an exciter providing field current to the field winding which induces current in the stator winding and produces an output voltage at the output terminals. The exciter comprises a first transducer providing a measure of field excitation and a potential transformer providing a measure of output terminal voltage. The exciter also includes a manual regulator for selectively providing the field current to the field winding as a function of the measure of field excitation. The exciter further includes an automatic regulator selectively providing the field current to the field winding regulated as a function of the measure of output terminal voltage. A regulator selector connects one of the manual regulator and the automatic regulator to provide the field excitation. This selector includes means responsive to failure of the manual regulator preventing switching from the automatic regulator to the manual regulator. For instance, the regulator selector includes logic responsive to loss of the field transducer excitation signal for preventing switching from the automatic regulator to the manual regulator. In the exemplary embodiment of the invention, the regulator selector includes AND logic for selecting the manual regulator. This AND logic has at one input a manual regulator selection signal and at a second input the negative of a signal indicative of a failure of the manual regulator. Thus, only in the absence of a signal indicative of the failure of the manual regulator can the manual regulator be selected.

BRIEF DESCRIPTION OF THE DRAWINGS

A full understanding of the invention can be gained from the following description the preferred embodiments when read in conjunction with the accompanying drawings in which:

FIGS. 3a–3d illustrate logic elements in the form of switches, latches, AND gates and OR gates, respectively, used in the logic ladder diagram of FIGS. 2a and 2b.

DESCRIPTION OF THE PREFERRED EMBODIMENTS

Figure 1:
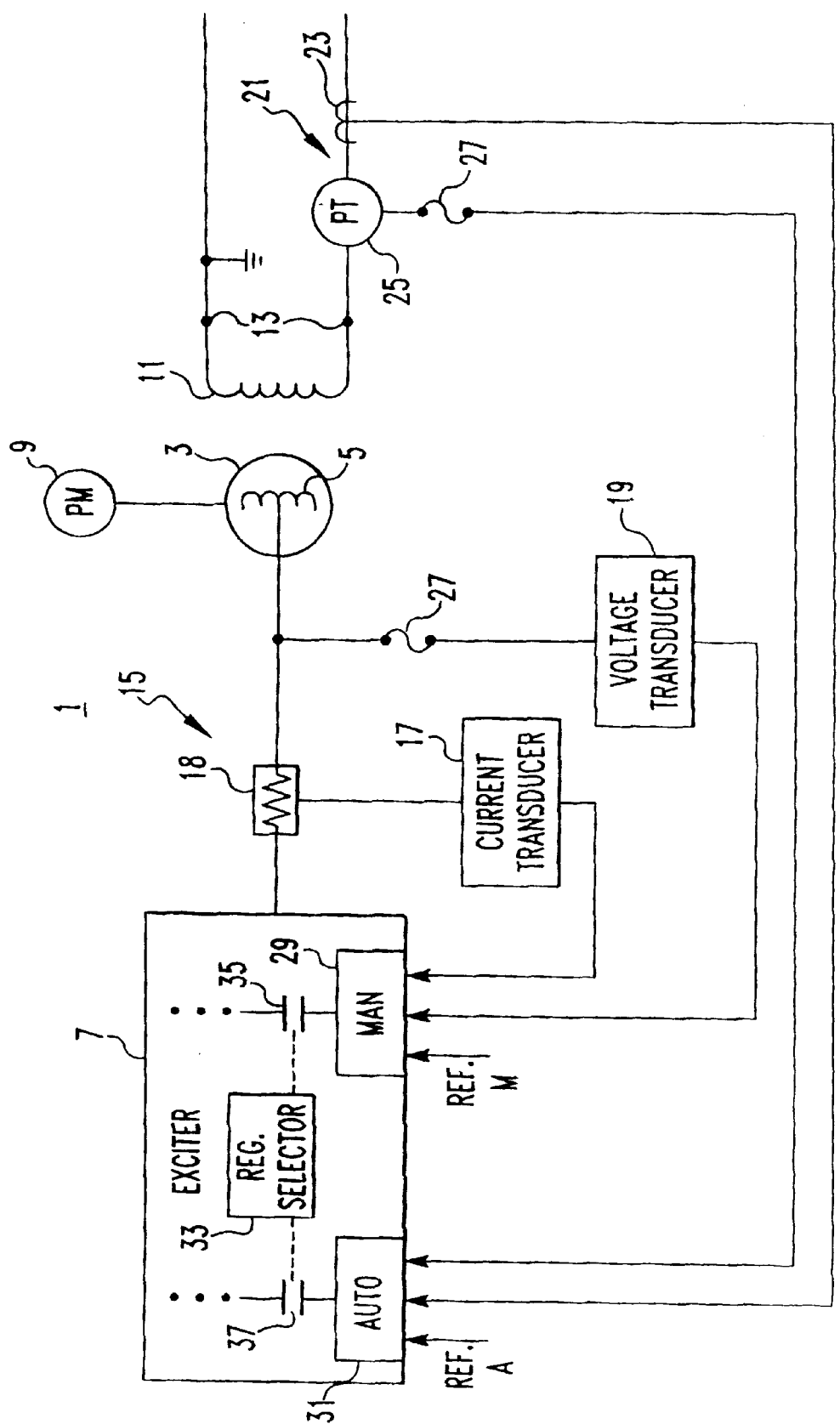
FIG. 1 is a schematic diagram of an electric power generator with an exciter in accordance with the invention.

Referring to FIG. 1, a synchronous generator 1 has a rotor 3 with a field winding 5. Current is provided to the field winding by an exciter 7. The rotor is driven by a prime mover 9 such as a steam, gas or hydraulic turbine. The rotating magnetic field produced by the field winding 3 induces a voltage in the stator 11 which appears at the stator output terminals 13. A first set of transducers 15 including a current transducer 17 (across shunt 18) and a voltage transducer 19 provide a measurement of the field current and field voltage, respectively. A second set of transducers 21, including the current transformer 23 and potential transformer 25, provide a measure of the stator current and voltage, respectively. The voltage transducer 19 and the potential transformer 25 are each protected by a fuse 27.

The exciter 7 includes a manual regulator 29 and an automatic regulator 31. A regulator selector 33 selectively connects either the manual regulator 29 or the automatic regulator 31 to control excitation for the field winding 5. The manual regulator 29 regulates either the field voltage or the field current to a reference value (Ref.M) using feedback from the CT 17 and BT 19.

The automatic regulator 31, when selected, regulates field excitation as a function of output terminal voltage, that is the voltage across the output terminals 13 of the stator. The automatic regulator receives feedback from the potential transformer 25 which provides a measurement of this output voltage, and from the current transformer 23. The output voltage is regulated to a value determined by a reference signal (Ref. A). As the automatic regulator 31 regulates the field current as a function of the output terminal voltage, which is the primary controlled variable, it is the preferred regulator. However, as there is no output voltage initially during startup, the system is started in manual and then switched to automatic. Also, should the automatic system fail, control can be switched to the manual regulator. In addition, there are other instances where the operator may want to switch to the manual control. This could occur, for instance, when the automatic system needs to be taken out of service for repair. There are instances, however, where the manual system has failed and therefore switching from a working automatic regulator to the manual regulator will result in failure of the generator. Obviously, loss of the generator is to be avoided if at all possible. There could be various reasons for failure of the manual regulator 29; however, possible causes could be the loss of the voltage transducer 19 or the blowing of the associated fuse 27. Such a failure of the manual regulator is not known to the operator, which could result in loss of the generator if a transfer were attempted from the working automatic regulator 31 to the failed manual regulator 29.

Figure 2A:
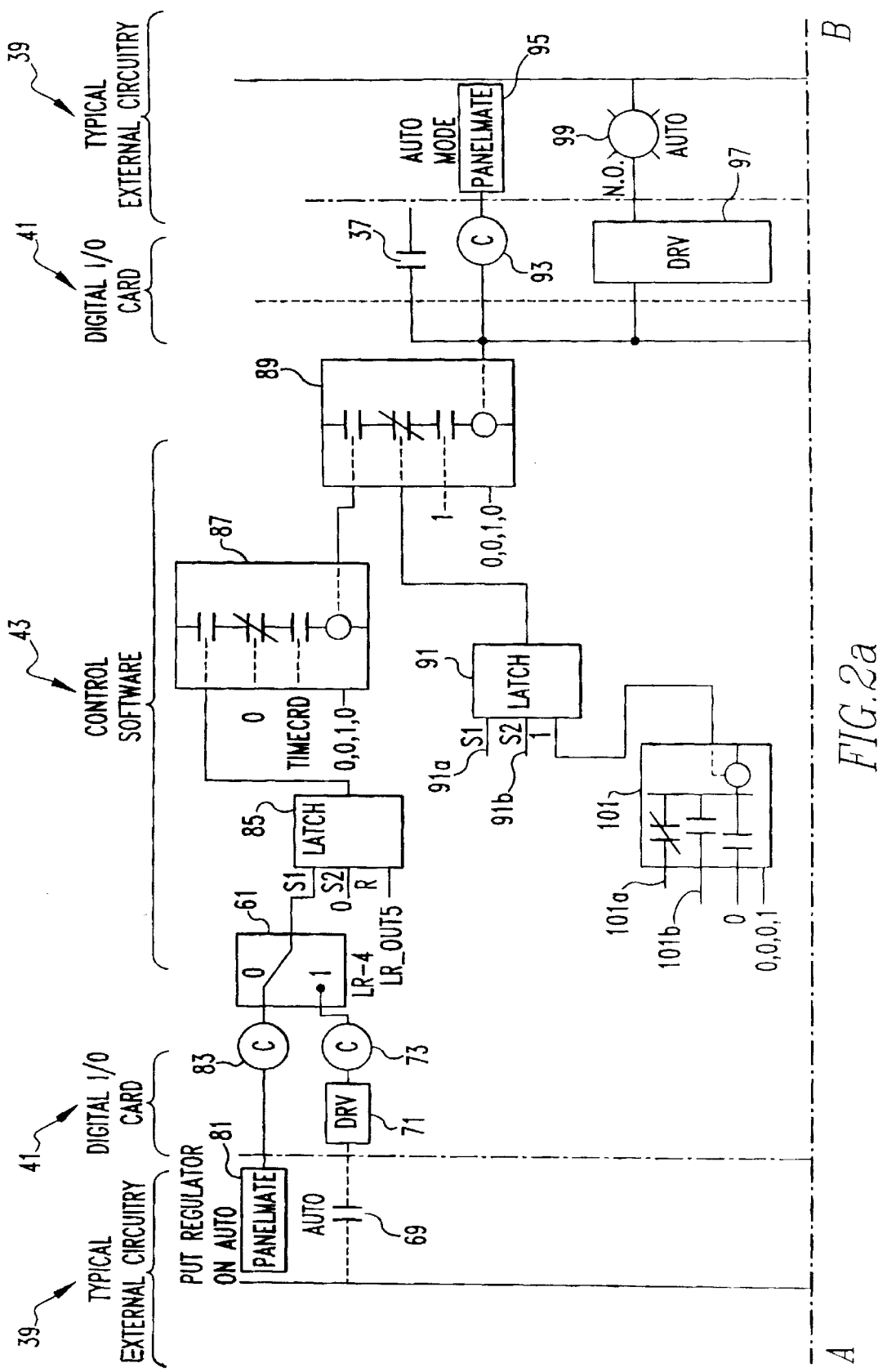
FIGS. 2a and 2b when joined together along the lines A–B, illustrate a logic ladder diagram for the software of the regulator selector which forms part of the exciter.

The regulator selector 33 connects either the manual regulator 29 to provide field excitation through the contacts 35 or the automatic regulator 31 through the contacts 37. The regulator selector 33 utilizes a digital processor to implement logic for the selection of the regulator to provide field excitation. The algorithm implemented by the software for the selection of the active regulator is illustrated in the logic ladder diagram of FIGS. 2a and 2b. Typical external circuitry 39 at the input and the output are illustrated on the left and right sides of the diagram. Digital input/output cards 41 are illustrated inside the external circuitry and the control software logic 43 is illustrated down the center of the diagram. The software logic includes switches such as 45, latches such as 47, AND gates 49, and OR gates such as 51 illustrated in FIGS. 3a–3d, respectively. When a "0" is applied to the switch control input (not shown), the upper input is selected. A "1" selects the lower input. The latches have two set inputs, $S_1$ and $S_2'$ and one reset input R. The AND gates are shown as standard modules all having three sets of contacts which must be closed in order for the module to generate an output of "1". In many cases, all of the inputs are not used. The associated contacts must be closed in order that the other inputs can be effective. To indicate this, a "1" is shown at the input where the contact is normally open, and a "0" where the contact is normally closed. The series of numerals adjacent the lower left corner indicates the normal states of the three inputs and the normal output state, respectively. Similarly, the standard OR modules include three inputs. Unused inputs to the AND or OR gate must be set to a 1 or 0 as required. Again, the normal states are shown adjacent the lower left corner.

Figure 2B:
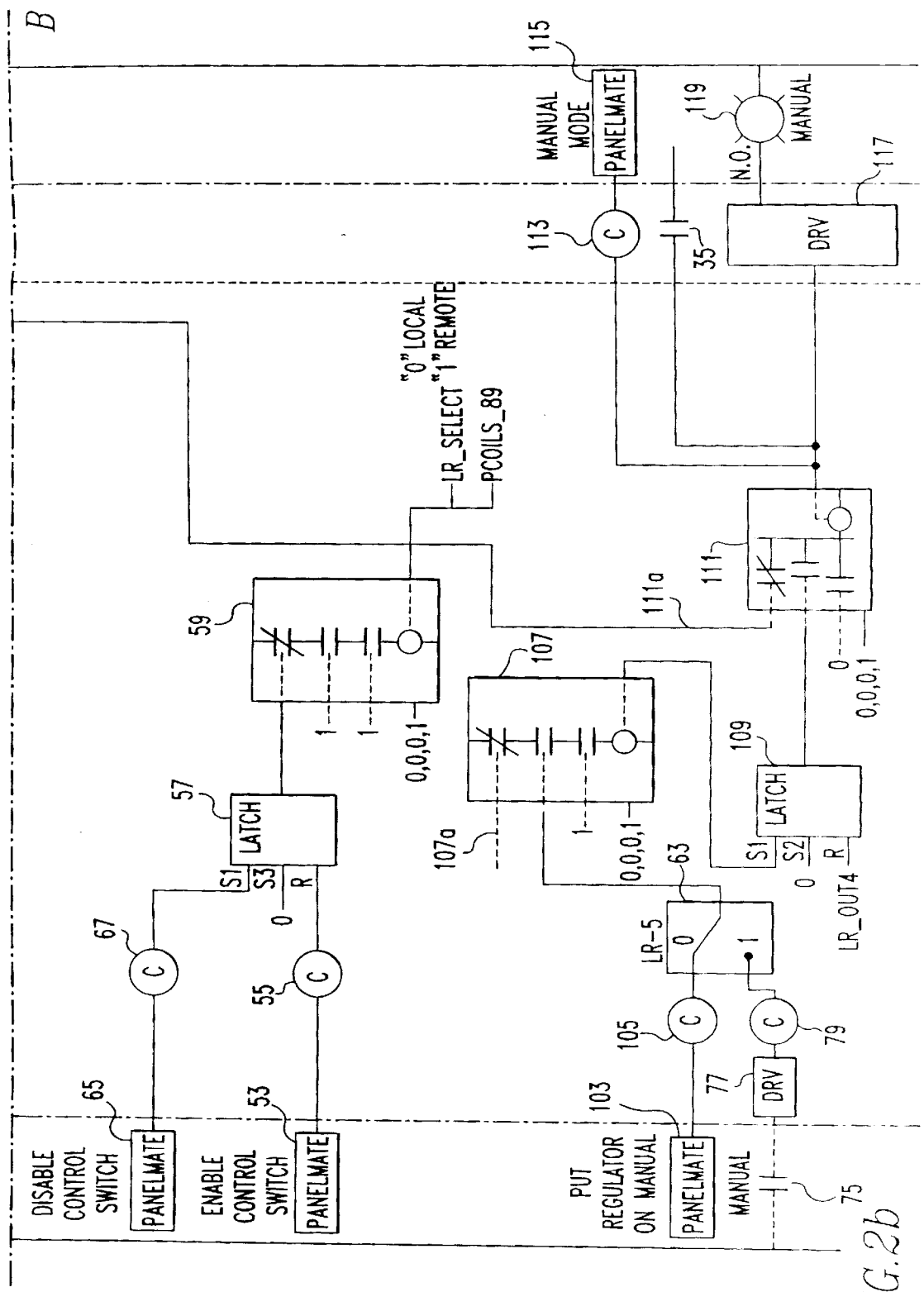

The regulator selector 33 can be controlled locally at the exciter by a local input/output system such as a PANELMATE™ controller and also remotely, such as from the control room. Selection of either local or remote control is made from the PANELMATE™ controller. This is shown at the top of FIG. 2b. When enable control switch 53 is actuated at the PANELMATE™ controller, a particular Modbus bit is sent to the logic, the state of which is reflected by COIL 55 which is energized to reset the output of latch 57 to "0". This causes the output of AND gate 59 to go to "1", as the other two inputs are not used. One output from the AND gate 59 is the signal LR_SELECT which sets the switches 61 and 63 to the "1" setting for remote control from the control room. The other output of AND gate 59 provides feedback to the PANELMATE™ controller.

When the disable control switch 65 is selected to energize the coil 67, the output of the latch 57 goes to "1" thereby causing the output of AND 59 to go to "0" and switching the switches 61 and 63 to the "0" input through which the regulator selector is controlled locally from the PANELMATE™ controller. If remote control is selected, the operator can command automatic control by closing the contacts 69, which through the driver 71, energize coil 73 to cause the output of the switch 61 to go to "1". Similarly, the operator can close the remote contacts 75 to actuate driver 77 and energize the coil 79 to initiate manual control remotely.

Assuming that as shown local control has been selected so that the switches 61 and 63 are in the "0" position, if the automatic regulator is selected through the PANELMATE™ controller at 81, the coil 83 is energized to set the latch 85 to "1" through the switch 61. This closes the top contacts of AND gate 87. The second set of contacts in the AND gate 87 are not used, and are therefore always closed. The bottom contacts only close after a timer has timed out. The timer begins timing when the exciter is first started to energize the field winding and requires about 5 seconds to time out. This prevents the automatic regulator from being used initially on startup since as will be recalled, the automatic regulator uses stator output voltage as a feedback signal and there is no output voltage initially. When the timer times out, the output of AND gate 87 goes to "1" to close the top contacts of AND gate 89. The output of AND gate 89 goes to "1" as long as the output of latch 91 is "0". With the output of AND gate 89 high, the auto regulator contacts 37 are closed to connect the automatic regulator 31 to provide excitation for the field winding 5. This also energizes the coil 93 which provides an automatic mode feedback signal at 95 to the PANELMATE™ controller and through driver 97 turns on indicator light 99 indicating that the automatic regulator is connected.

The output of the latch 91 goes to "1" if a signal on the first set input 91a goes to "1" indicating that the field current is above a selected limit. The output of latch 91 will also go to "1" if the signal on the second set input 91b goes to "1" indicating that generator voltage has been lost. In either case, when the output of latch 91 goes to "1", the output of AND gate 89 goes to "0" to disconnect the automatic regulator 31. The latch 91 is reset by OR gate 101 either when the circuit breaker for the exciter power opens so that the signal on input 101a goes to "0", or when the signal on the input 101b goes to "1", which occurs when the output of the switch 63 goes to "1" indicating that a signal has been generated either locally or remotely to select the manual regulator. Thus, if the automatic regulator has been disconnected either because of high field current or loss of voltage, control must be switched to the manual regulator before the automatic regulator can be engaged again.

If local control has been selected so that the switch 63 is in the position shown in FIG. 2, the manual regulator can be selected from the PANELMATE™ controller by a signal 103 from the PANELMATE™ controller selecting the manual regulator. This energizes the coil 105 which causes the output of the switch 63 to go to "1". Normally, this will cause the output of AND gate 107 to go to "1", setting the output of the latch 109 to "1", which in turn makes the output of the OR gate 111 "1" to close the contacts 35 connecting the manual regulator 29 to provide excitation to the field winding. This also energizes the coil 113 to provide a manual mode indication at 115 to the PANELMATE™ controller and through the driver 117 turns on an indicator light 119 indicating that the manual regulator has been connected. However, if there has been a failure of the manual regulator, there will be a "1" signal on the upper input 107a of the AND 107 which will make the output of the AND gate 107 "0" and therefore prevent the manual regulator from being connected. It will be seen that the upper input 111a of the AND gate 111 is connected to the output of the AND gate 89 of the logic for connecting the automatic regulator. This allows control to be transferred from the manual regulator to the automatic regulator during startup after the five second delay has expired.

The latch 85 is reset by the signal LR_OUT5 when switch 63 goes high upon selection of the manual regulator. Similarly, the latch 109 is reset by the signal LR_OUT4 when the automatic regulator is selected.

As has been shown, the invention prevents a transfer being made from the automatic regulator of a generator exciter to a failed manual regulator. This avoids an unnecessary tripping of the generator which would occur if the transfer to the failed manual system were permitted. If the automatic system fails while the manual regulator is inoperative, other logic trips the generators as there is no viable control for the exciter.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electric power generator comprising:
   a rotor having a field winding;
   a prime mover rotating the rotor;
   a stator having a stator winding with output terminals; and
   an exciter providing field current to the field winding which induces current in the stator winding and produces an output voltage at the output terminals, the exciter comprising:
      a transducer providing a measurement of field excitation;
      a potential transformer providing a measurement of voltage at the output terminals;
      a manual regulator for selectively providing the field current to the field winding as a function of the measure of field excitation;
      an automatic regulator selectively providing the field current to the field winding and regulating field excitation as a function of the measurement of output terminal voltage; and
      a regulator selector selectively connecting one of the manual regulator and automatic regulator to provide the field excitation including means responsive to failure of the manual regulator preventing switching from the automatic regulator to the manual regulator.

2. The generator of claim 1 wherein the regulator selector includes logic responsive to loss of the measure of field excitation for preventing switching from the automatic regulator to the manual regulator.

3. The generator of claim 2 wherein the regulator selector includes AND logic for selecting the manual regulator, the AND logic selecting the manual regulator in response to a manual regulator selection signal and the absence of a signal indicative of a failure of the manual regulator.

4. An exciter system for an electric power generator having a field winding and a stator winding having output terminals;
   a first transducer providing a measurement of field excitation;
   a potential transformer providing a measure of voltage at the output terminals;
   a manual regulator providing field excitation as a function of the measurement of field excitation and a first reference signal;
   an automatic regulator providing field excitation as a function of the measurement of voltage at the output terminals and a second reference signal; and
   a regulator selector selectively switching between connection of the manual regulator and the automatic regulator to the field winding, and responsive to failure of the manual regulator to prevent switching from the automatic regulator to the manual regulator.

5. The exciter system of claim 4 wherein the selector regulator includes the logic responsive to loss of the measurement of field excitation for preventing switching from the automatic regulator to the manual regulator.

6. The exciter system of claim 4 wherein the regulator selector includes AND logic for selecting the manual regulator, the AND logic having as one input a manual regulator selection signal and as a second input the negative of a signal indicative of failure of the manual regulator.

* * * * *